Sept. 5, 1933.  D. D. LEVY  1,925,101
SHOCK ABSORBING MECHANISM
Filed Jan. 3, 1930  2 Sheets-Sheet 2

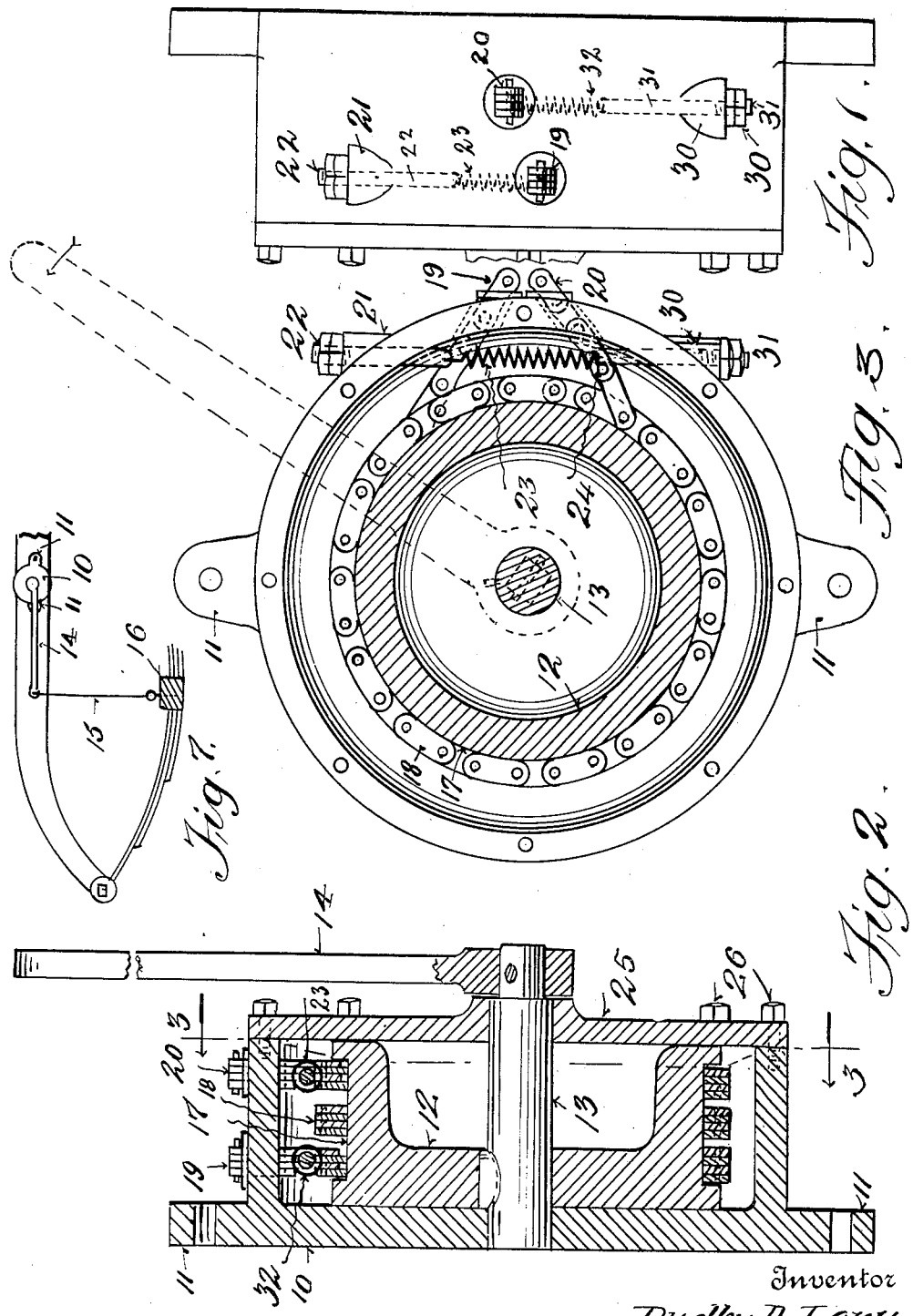

Inventor
Dudley D. Levy
By his Attorneys
Darby & Darby

Patented Sept. 5, 1933

1,925,101

UNITED STATES PATENT OFFICE 1,925,101

SHOCK ABSORBING MECHANISM

Dudley D. Levy, New York, N. Y., assignor to Dudley Research Corporation, New York, N. Y., a corporation of New York Application January 3, 1930. Serial No. 418,273

4 Claims. (Cl. 188—130)

This invention relates to mechanism for absorbing or deadening vibrations of automobile axles and attached parts and has for its object the provision of means to neutralize or lessen the effect of road shocks on a moving automobile body.

A further object is the provision of a simple and efficient shock absorbing mechanism which may be readily attached to an automobile frame or other parts where it is desired to lessen the vibratory motions.

Other objects will appear hereinafter and I obtain these objects by the construction illustrated in the accompanying drawings, in which—

Figure 1 is a top plan view of a construction which embraces the principles of my invention;

Fig. 2 is a sectional view thereof;

Fig. 3 is a view taken on the line 3—3 of Fig. 2;

Fig. 7 is a side elevation of the device as applied on a vehicle.

Like reference numerals refer to similar parts throughout the several views wherever they occur.

Figure 6:
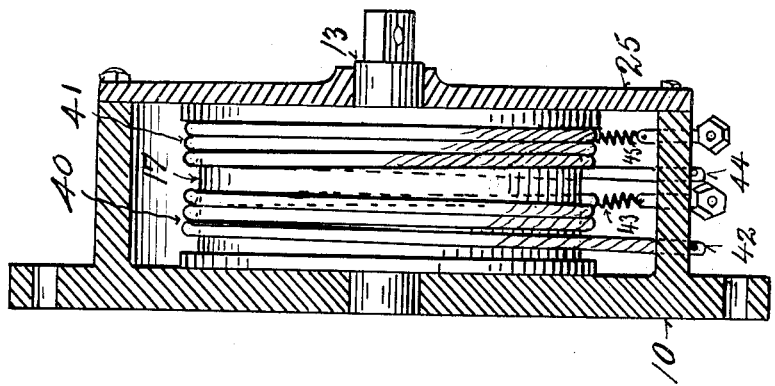
Fig. 6 is a view partially in section showing the reversely wound flexible brake members as they appear on the brake drum.

In its simplest form my shock absorbing mechanism comprises a brake drum mounted to oscillate on its axle and having attached thereto a lever arm to which road shocks or rebounds are imparted. In a preferred form the brake drum is provided with a friction seat on which may be wound a flexible brake member, each end of which is secured and forms a fixed seat when the brake member is moved in one direction, while at an intermediate point at or near the other end of the flexible member there is provided a tensioning means to tension the flexible member on the brake surface during the period of motion in said direction. By this arrangement shock is deadened as the lever moves in one direction. When now the lever is moved in the reverse direction due to rebound the other side of the flexible brake member becomes the fixed member and the intermediate tensioning member of the opposite end is the loose member which serves to tension the flexible brake member upon the brake surface while the lever is moved in the rebound direction. It will be apparent that as the lever moves up and down, or to and fro, the oppositely positioned tensioning devices become active while the corresponding fixed points serve to engage the flexible brake member upon the friction seat. That is to say, the brake drum of the shock absorbing mechanism is subjected to friction in either direction.

Referring now to the drawings, I provide a casing 10 having ears 11, 11 for conveniently attaching the casing to any suitable part, as the frame of an automobile, and in which there is provided a brake drum 12. The brake drum is mounted to oscillate about its axis and for this purpose I provide an axle 13 to which the drum is fastened. Attached to either the axle 13 or directly to the drum is a lever arm 14 to which is attached by a suitable joint a shock transmitting bar 15, which bar is fastened directly to an axle 16 of an automobile. The brake drum is provided with a friction seat 17 on which is wound by several coils a flexible brake member 18 the ends of which are fastened in the casing 10, one end being fastened at 19 and the other at 20. Intermediate of the fastened ends and immediately beneath the casing there is provided for each fastened or fixed end a tensioning device, as a spring 23, which is held in an anchored seat 21 on the casing 10. This anchor device has adjusting means 22 to which is fastened spring 23, the end of which is attached at 24 to the flexible brake member. It will be apparent that when the brake drum is rotated in anticlockwise direction that the end 19 is the fixed point and the opposite end of the flexible brake member is the loose point which the tensioning member 23 tensions onto the brake surface for the direction just indicated. A similar arrangement is provided for the other end of the flexible brake member which is indicated at 20. A spring 32 attached to a seat 30, which may be adjusted by means of an anchor device 31, tensions the flexible brake member onto the drum surface when the brake drum and lever move in a clockwise direction. From this it is apparent that vibratory motions, such as road shocks and rebounds, are effectively deadened by means of the flexible brake member being tensioned from either direction upon the friction seat of the brake drum and this tensioning is increased from a negative quantity to an increased positive quantity as the lever is moved a greater distance from its neutral point. By adjusting the tension of springs 23 and 32 the degree of tensioning device of the brake mechanism is increased. In the construction shown I provide a cover 25 for the casing which is held in position by bolts 26.

Figure 5:
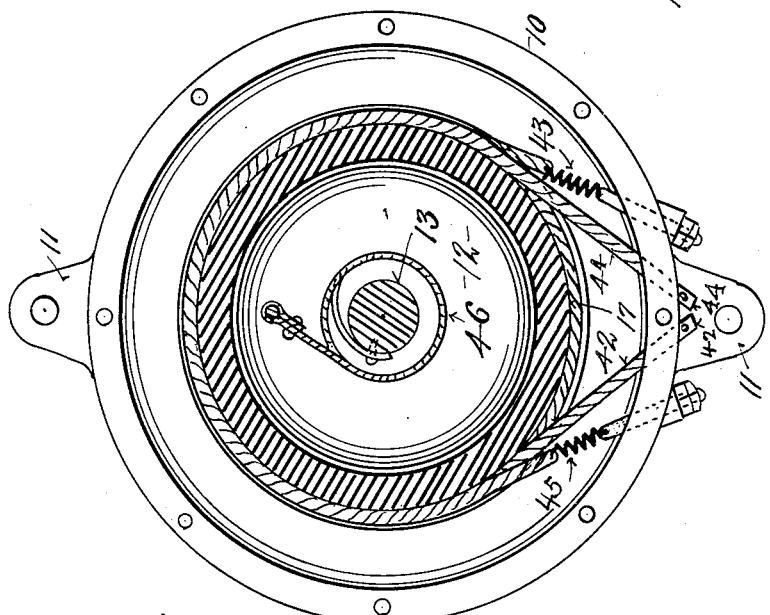
Fig. 5 is a view taken on the line 5—5 of Fig. 4.
Figure 4:
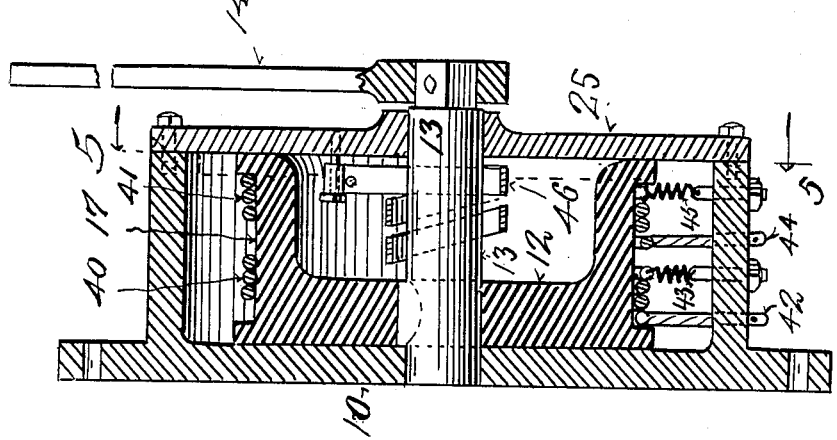
Fig. 4 is a sectional view showing a reversely wound flexible brake member.

The construction just defined applies to a single member coiled about the friction seat of the brake drum. It is obvious that instead of a single member thus provided with fixed end seats and intermediate tensioning means that I may provide reversely wound flexible brake members, as is indicated by the construction shown in Figs. 4, 5 and 6. In this construction the friction surface 17 of the brake drum 12 is provided with reversely wound coils 40 and 41. Coil 40 has its fixed point at 42 and its tensioning device at 43. By this arrangement the degree of friction applied to the surface is regulated by tensioning the coil 43. This coil becomes effective when the brake drum oscillates about its axis against the pull of the fixed point 42. In coil 41 the reverse position is indicated so that the fixed point 44 become effective when the brake drum oscillates in reverse direction. Spring 45 tensions the coil about the brake drum for that direction.

For some purposes I provide a return spring 46, one end of which is fastened to the axle 13 and the other end of which is fastened to a portion of the casing, as cover 25. When this type of construction is used the proper coil 40 or 41, is depending upon the direction of deadening effect, released by loosening the corresponding tensioning spring. In this construction the mechanism acts as a stop mechanism for one direction only and is, therefore, suitable for use in other connections than automobile shock absorbers, as for example for door checks. In the present application, however, I have shown the specific application of my shock absorbing mechanism as applied to an automobile construction. It is apparent to those skilled in the art that many changes may be made in the details of construction without departing from the spirit and scope of my invention as defined in the attached claims.

What I claim therefore as new and useful and desire to secure by Letters Patent is:

1. In a shock absorbing mechanism, the combination of a drum member mounted to oscillate about its axis, said drum member having a friction seat and a flexible brake member engaging said friction seat, means to hold one end of said flexible brake member rigidly while the other end is held loosely when the brake member moves in either direction, and a tensioning member for each end to tighten said loosely held end of the flexible member as the drum oscillates in either direction.

2. In a shock absorbing mechanism, the combination of a drum member mounted to oscillate about its axis, said drum member having a friction seat and a continuous flexible brake band completely surrounding said drum member and engaging said friction seat, means to hold one end of the band rigidly during one directional oscillation, and means to hold the other end of the band rigidly during opposite direction of oscillation.

3. In a shock absorbing mechanism, the combination of a casing and a drum member in said casing, a lever arm supported on said drum member to oscillate with said drum as shocks are transmitted to the lever arm, and a flexible member wound on said drum, said flexible member held at both ends, and means intermediate said ends and the portion of the flexible member engaging the drum whereby the flexible member is tensioned onto the drum as said drum is moved in either direction.

4. In a shock absorbing mechanism, the combination of a casing and a drum member in said casing, a lever arm supported on said drum member to oscillate with said drum as shocks are transmitted to the lever arm, a flexible member wound on said drum, said flexible member supported at both ends, and means intermediate said ends and the portion of the flexible member engaging the drum to permit free movement of the lever arm until the flexible member is tensioned.

DUDLEY D. LEVY.